United States Patent
Ahluwalia et al.

(10) Patent No.: US 10,511,963 B2
(45) Date of Patent: *Dec. 17, 2019

(54) METHODS AND DEVICES FOR INTERNATIONAL MOBILE SUBSCRIBER IDENTITY (IMSI) RECLAMATION

(71) Applicants: AT&T Mobility II LLC, Atlanta, GA (US); AT&T Intellectual Property I, L.P., Atlanta, GA (US)

(72) Inventors: Inderpreet Singh Ahluwalia, Austin, TX (US); Rajagopal Vasudevan, Dunwoody, GA (US); Nicolas Edward Lam Pak Ng, Sammamish, WA (US); Jeffrey Kinsella, Atlanta, GA (US); Lester Lowe, Lithonia, GA (US); Zulfikar Ali, Buford, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/239,152

(22) Filed: Jan. 3, 2019

(65) Prior Publication Data

US 2019/0174300 A1    Jun. 6, 2019

Related U.S. Application Data

(63) Continuation of application No. 15/830,737, filed on Oct. 4, 2017, now Pat. No. 10,200,857.

(51) Int. Cl.
*H04W 8/26* (2009.01)
*H04L 29/12* (2006.01)

(52) U.S. Cl.
CPC .......... *H04W 8/26* (2013.01); *H04L 61/2053* (2013.01); *H04L 61/157* (2013.01); *H04L 61/1511* (2013.01); *H04L 61/1588* (2013.01); *H04L 61/6054* (2013.01)

(58) Field of Classification Search
CPC ..... H04W 12/06; H04W 88/06; H04W 48/18; H04W 8/26
See application file for complete search history.

(56) References Cited

U.S. PATENT DOCUMENTS

| | | | |
|---|---|---|---|
| 7,561,555 B2 | 7/2009 | Abrol et al. | |
| 8,483,677 B2 | 7/2013 | Cheng et al. | |
| 8,515,488 B2 | 8/2013 | Hillier et al. | |
| 8,879,526 B2 | 11/2014 | Noldus | |
| 9,462,453 B2 | 10/2016 | Mohammed et al. | |
| 9,596,595 B2 | 3/2017 | Papili | |
| 9,723,426 B2 | 8/2017 | Khan et al. | |
| 9,794,905 B1 | 10/2017 | Chastain et al. | |

(Continued)

*Primary Examiner* — Diane D Mizrahi
(74) *Attorney, Agent, or Firm* — Guntin & Gust, PLC; Atanu Das (57) ABSTRACT

Aspects of the subject disclosure may include, for example, detecting that an IMSI associated with a first SIM is provisioned onto a first mobile device and designating the IMSI into an available state. Further embodiments can include determining an expiry period for the available state. Additional embodiments can include purging the IMSI from a plurality of mobile network devices and designating the IMSI into a reclaimable state in response to an expiration of the expiry period. Other embodiments are disclosed.

20 Claims, 7 Drawing Sheets

(56) References Cited

U.S. PATENT DOCUMENTS

| | | |
|---|---|---|
| 10,200,857 B1 * | 2/2019 | Ahluwalia .............. H04W 8/26 |
| 10,231,204 B2 * | 3/2019 | Chastain ............... H04W 60/04 |
| 2010/0048197 A1 | 2/2010 | Jiang |
| 2015/0079986 A1 | 3/2015 | Nayak et al. |
| 2016/0134316 A1 | 5/2016 | Mohan et al. |
| 2016/0323731 A1 | 11/2016 | Mohammed et al. |
| 2017/0142572 A1 | 5/2017 | Anslot et al. |

* cited by examiner

ND DEVICES FOR
METHODS AND DEVICES FOR INTERNATIONAL MOBILE SUBSCRIBER IDENTITY (IMSI) RECLAMATION

CROSS-REFERENCE TO RELATED APPLICATIONS

This application is a continuation of U.S. patent application Ser. No. 15/830,737 filed Dec. 4, 2017. The contents of the foregoing are hereby incorporated by reference into this application as if set forth herein in full.

FIELD OF THE DISCLOSURE

The subject disclosure relates to a methods and devices for IMSI reclamation.

BACKGROUND

An IMSI is associated with a subscriber identity module (SIM) for a communication device. Further, the communication device can be a mobile phone, wearable device, a sensor, an Internet of Things (IoT) device or any communication device with a SIM. Every communication device has a unique IMSI. Although the IMSI is a 15 digit number for which many different unique numbers can be derived, provisioning a unique IMSI for each communication device can lead to a scarce resource, especially in certain geographic regions.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for IMSI reclamation. The embodiments can include detecting that an IMSI associated with a first SIM is provisioned onto a first mobile device and designating the IMSI into an available state. Further embodiments can include determining an expiry period for the available state. Additional embodiments can include purging the IMSI from a plurality of mobile network devices and designating the IMSI into a reclaimable state in response to an expiration of the expiry period. Other embodiments are described in the subject disclosure.

One or more aspects of the subject disclosure include a device. The device can include a processing system including a processor and a memory that stores executable instructions that, when executed by the processing system, facilitate performance of operations. The operations can include detecting or determining that an international mobile subscriber identity (IMSI) associated with a first subscriber identity module (SIM) is provisioned onto a first mobile device and designating the IMSI into an available state. Further operations can include determining an expiry period for the available state. Additional operations can include purging the IMSI from a plurality of mobile network devices and designating the IMSI into a reclaimable state in response to an expiration of the expiry period.

One or more aspects of the subject disclosure include a machine-readable storage medium, comprising executable instructions that, when executed by a processing system including a processor, facilitate performance of operations. The operations can include detecting that an IMSI associated with a first SIM is provisioned onto a first mobile device and designating the IMSI into an available state. Further operations can include determining an expiry period for the available state. Additional operations can include purging the IMSI from a plurality of mobile network devices and designating the IMSI into a reclaimable state in response to an expiration of the expiry period. Also, operations can include provisioning the IMSI with a second SIM onto a second mobile device.

One or more aspects of the subject disclosure include a method. The method can include provisioning, by a processing system including a processor, an IMSI to a first SIM and designating the IMSI into an available state. Further, the method can include notifying, by the processing system, a plurality of mobile network devices of an IMSI for the first SIM. In addition, the method can include determining, by the processing system, an expiry period for the available state. Also, the method can include purging, by the processing system, the IMSI from the plurality of mobile network devices and designating the IMSI into a reclaimable state in response to an expiration of the expiry period.

Figure 1:
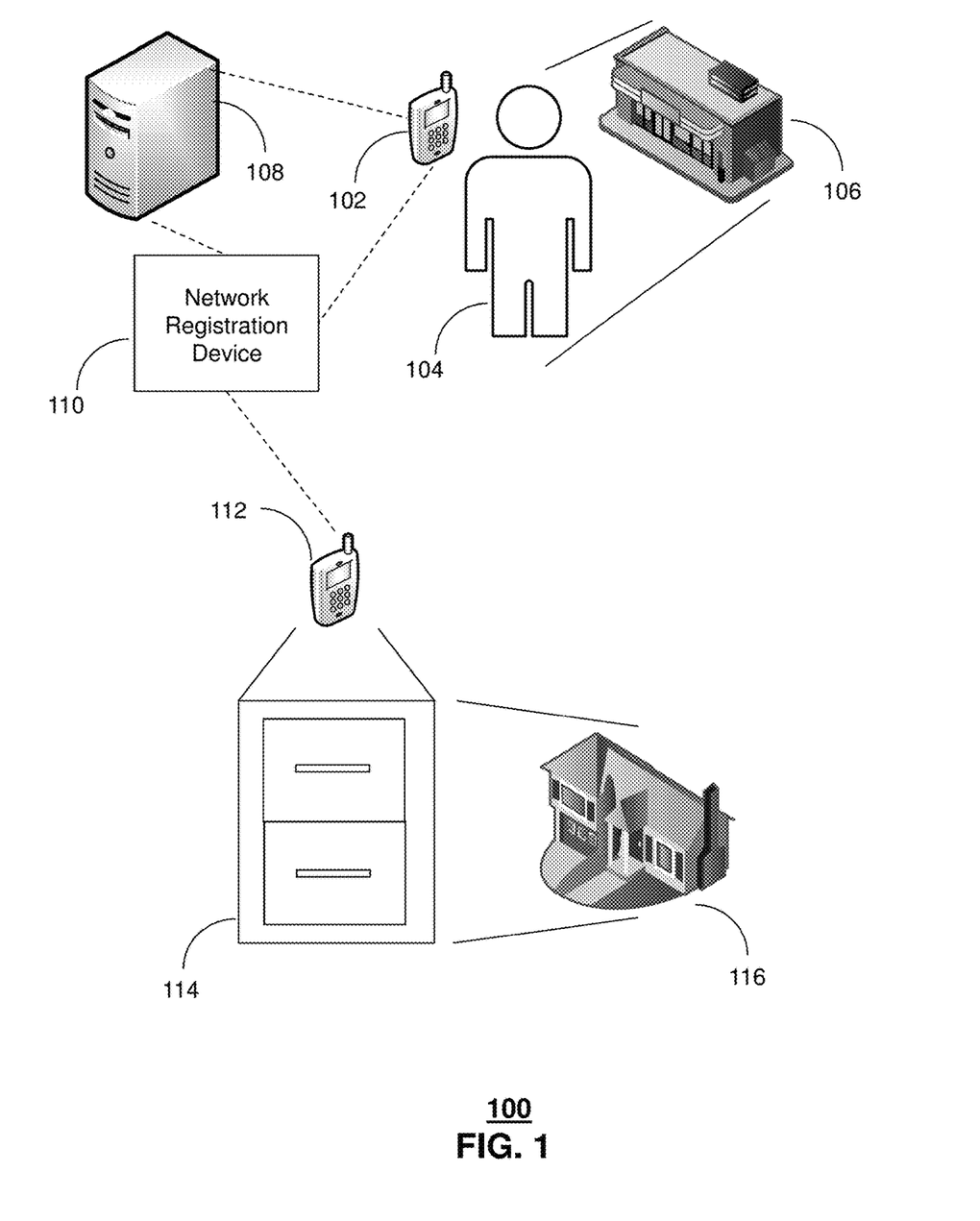
FIG. 1 depicts an illustrative embodiment of a system for IMSI reclamation.

FIG. 1 depicts an illustrative embodiment of a system 100 for IMSI reclamation. In one or more embodiments, the system 100 can include a SIM manager 108 communicating with a network registration device 110 for a mobile network. The SIM manager 108 can be a server and the network registration device 110 can be a computing device. Further, the system 100 can include communication device 102 associated with user 104. In addition, the system 100 can include a communication device 112. Communication devices 102 and 112 can be a mobile phone, wearable device, a sensor, an Internet of Things (IoT) device or any communication device with a SIM and associated with an IMSI.

In one or more embodiments, the communication device 112 can be provisioned with an IMSI some time ago but communication device 112 was never activated or registered with the network registration device 110 to be placed in use within a mobile network. Instead, it is stored, in a filing cabinet 114 in a home 116 of its associated user, or it could have even been lost or damaged or returned to the wireless carrier.

In one or more embodiments, the SIM manager 108 implements a state machine for the IMSI associated with the communication device 112. In some embodiments, the SIM manager has set an expiry timer after the IMSI was provisioned and designated into an available state (i.e. ready to activate to use in a mobile network). Upon provisioning the IMSI to communication device 112, the SIM manager notifies mobile network devices such as network registration device 110 to expect communication device 112 to register with the mobile network with the provisioned IMSI. After the expiry timer expires, the SIM manager 108 reclaims the IMSI. Such an IMSI reclamation process includes purging the IMSI from the mobile network devices including network registration device 110 so that the IMSI is no longer associated with communication device and designate the IMSI is in a reclaimable state.

In one or more embodiments, the SIM manager 108 provisions the reclaimed IMSI to communication device 102 that was recently purchased from a mobile network operator/retailer 106. Further, the SIM manager 108 notifies mobile network devices including the network registration device 108 that the reclaimed IMSI is provisioned to communication device 102 and to expect the communication device 102 to register with the mobile network with the provisioned, reclaimed IMSI.

In one or more embodiments, the communication device 112 may attempt to register with the network registration device 110 after the IMSI was reclaimed and provisioned to communication device 112. In such an embodiments, the network registration issues a network registration error to the communication device 112 indicating that it cannot register with the mobile network. In some embodiments, the communication device 112 can be provisioned with a new IMSI to register with the network registration device 110 and use the mobile network.

Figure 2:
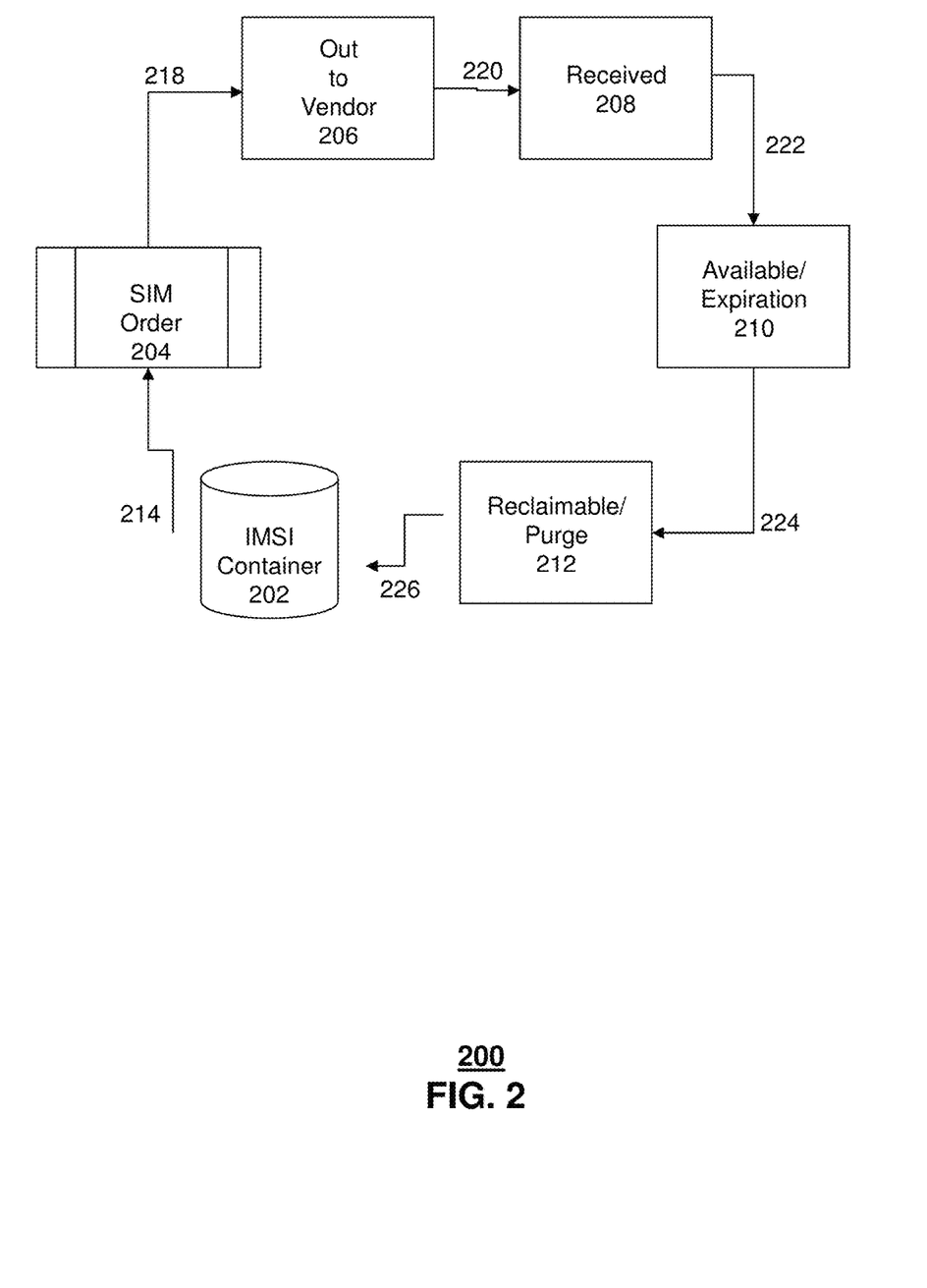
FIG. 2 depicts an illustrative embodiment of a state machine for IMSI reclamation.

FIG. 2 depicts an illustrative embodiment of a state machine 200 for IMSI reclamation. In one or more embodiments, the state machine 200 associated with an IMSI can be implemented by a SIM manager or other computing device operated by a mobile network operator and accessible by a SIM vendor. One state the IMSI can be is in a hold state/IMSI container 202 that can include a database listing available IMSIs for provisioning to a SIM for a communication device to communicate over a mobile network. A state transition 214 orders a SIM with a SIM from the list of the IMSI container 202. Thus, state transition 214 results in designating the IMSI into the SIM order state 204. Further, the state transition 218 results in designating the IMSI into an out to vendor state 208 that allows or prompts the SIM vendor to provision the IMSI to a SIM. In such a state an input file request can be sent to the SIM vendor from a mobile network operator. The SIM can be associated with a communication device. In addition, state transition 220 results in designating the IMSI into a received state that includes the output files have been received by the SIM vendor to be provided to network devices of the mobile network operator. However, in such a state, the IMSI has not yet been loaded to mobile network devices (i.e. mobile network devices have yet to be notified that the IMSI is associated with the communication device). Also, state transition 222 results in designating the IMSI into an available state 210. When in the available state, the SIM vendor provides the output files to the mobile network devices and the output files have been successfully loaded to mobile network devices (i.e. the mobile network devices have been notified that the IMSI is associated with the communication device).

In one or more embodiments, once in the available state 210, an expiry timer may be set to determine whether to reclaim the IMSI because it has not been assigned to a subscriber and registered for use in the mobile network. Once the expiry timer expires, state transition 224 occurs resulting in designating the IMSI into a reclaimable state 212. When in this state, mobile network devices are notified that the IMSI is no longer in use in the mobile network. That is, the IMSI is purged from the mobile network devices (i.e. the output files are unloaded from the mobile network devices). Once the IMSI is purged from the mobile network devices, state transition 226 occurs resulting in the IMSI designated in the hold state/IMSI container 202, listing the IMSI available for provisioning to a new SIM associated with a new communication device.

Figure 3:
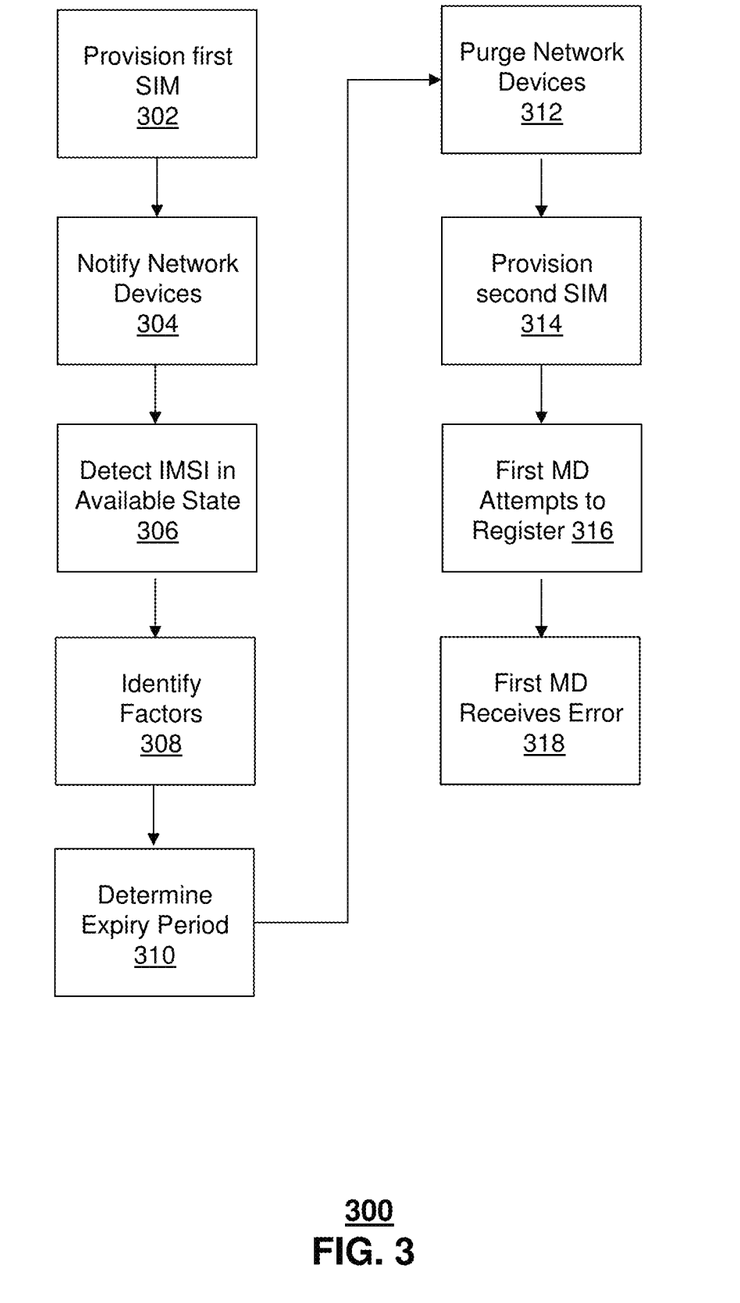
FIG. 3 depicts an illustrative embodiment of a method used in portions of the system described in FIG. 1.

FIG. 3 depicts an illustrative embodiment of a method 300 used in portions of the system described in FIG. 1. The method 300 can be implemented by a computing device such as a SIM manager or a group of computing devices. In one or more embodiments, the method 300 can include, at 302, the computing device provisioning, by a processing system including a processor, an IMSI to a first SIM and designating the IMSI into an available state. Further, the method 300 can include, at 304, the computing device notifying, by the processing system, a plurality of mobile network devices of an IMSI for the first SIM. In addition, the method 300 can include, at 306, detecting that the IMSI associated with a first SIM is provisioned onto a first mobile device and, in some embodiments, designating the IMSI into an available state. Also, the method 300 can include, at 308, identifying a plurality of factors for the first SIM. Further, the method 300 can include, at 310, determining an expiry period for the available state. In some embodiments, the determining the expiry period comprises determining the expiry period according the plurality of factors. The plurality of factors can include card type, mobile device type, and stock keeping unit (SKU). For example, if the mobile device type indicates a mobile phone, then the expiry period can be a long time (e.g. 5 years). However, if the mobile device type indicates a temperature sensor, then the expiry period can be a shorter time (e.g. 6 months). This may be because historical activation data indicates that most temperature sensors are activated within 6 months of being provisioned with an IMSI. However, historical activation data may indicate that most mobile phones can take up to 5 years to activate.

In one or more embodiments, the method 300 can include, at 312, purging the IMSI from a plurality of mobile network devices and designating the IMSI into a reclaimable state in response to an expiration of the expiry period. Further, the method 300 can include, at 314, provisioning the IMSI with a second SIM onto a second mobile device. In addition, the method 300 can include, at 316, the first mobile device attempting to register with the plurality of mobile network devices after the IMSI is provisioned with the second SIM onto the second mobile device. Also, the method 300 can include, at 318, the first mobile device receiving a network error from at least one of the plurality of mobile network devices in response to the attempt to register.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Embodiments described herein or portions thereof can be combined with other embodiments and portions thereof.

Figure 4:
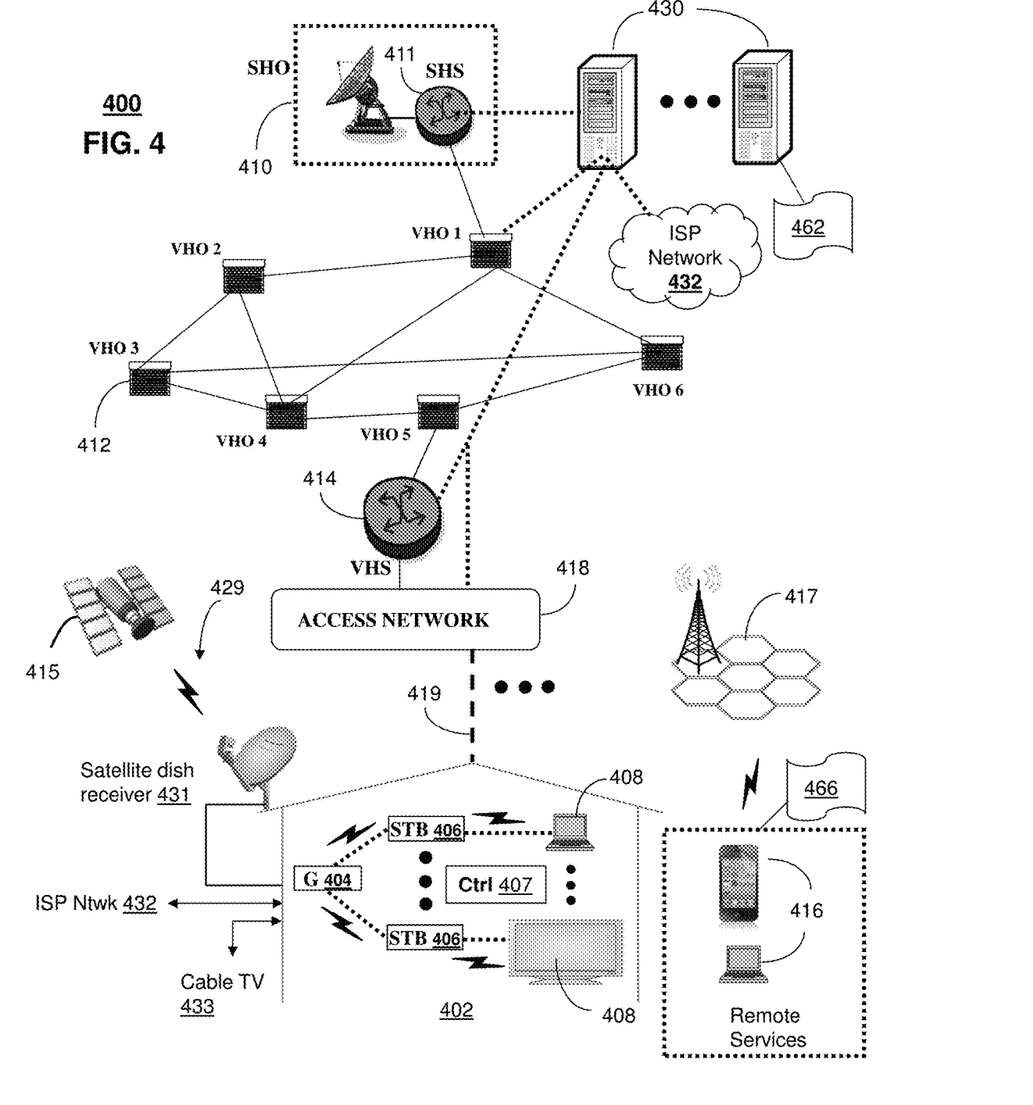
FIGS. 4-5 depict illustrative embodiments of communication systems that provide IMSI reclamation services shown in FIGS. 1-3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100, 200 of FIGS. 1 and/or 2 as another representative embodiment of communication system 400. For instance, in one or more embodiments, one or more devices illustrated in the communication system 400 of FIG. 4 can detect that an IMSI associated with a first SIM is provisioned onto a first mobile device and in an available state. In further embodiments, the one or more devices can determine an expiry period for the available state. In additional embodiments, the one or more devices can purge the IMSI from a plurality of mobile network devices and entering a reclaimable state in response to an expiration of the expiry period.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a SIM manager (herein referred to as SIM manager 430). The SIM manager 430 can use computing and communication technology to perform function 462, which can include among other things, the IMSI reclamation techniques described by method 300 of FIG. 3. For instance, function 462 of server 430 can be similar to the functions described for server 108 or network registration device 110 of FIG. 1 in accordance with method 300. The wireless communication devices 416 can be provisioned with software functions 466, respectively, to utilize the services of SIM manager 430. For instance, functions 466 of media processors 406 and wireless communication devices 416 can be similar to the functions described for the communication devices 102, 112 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
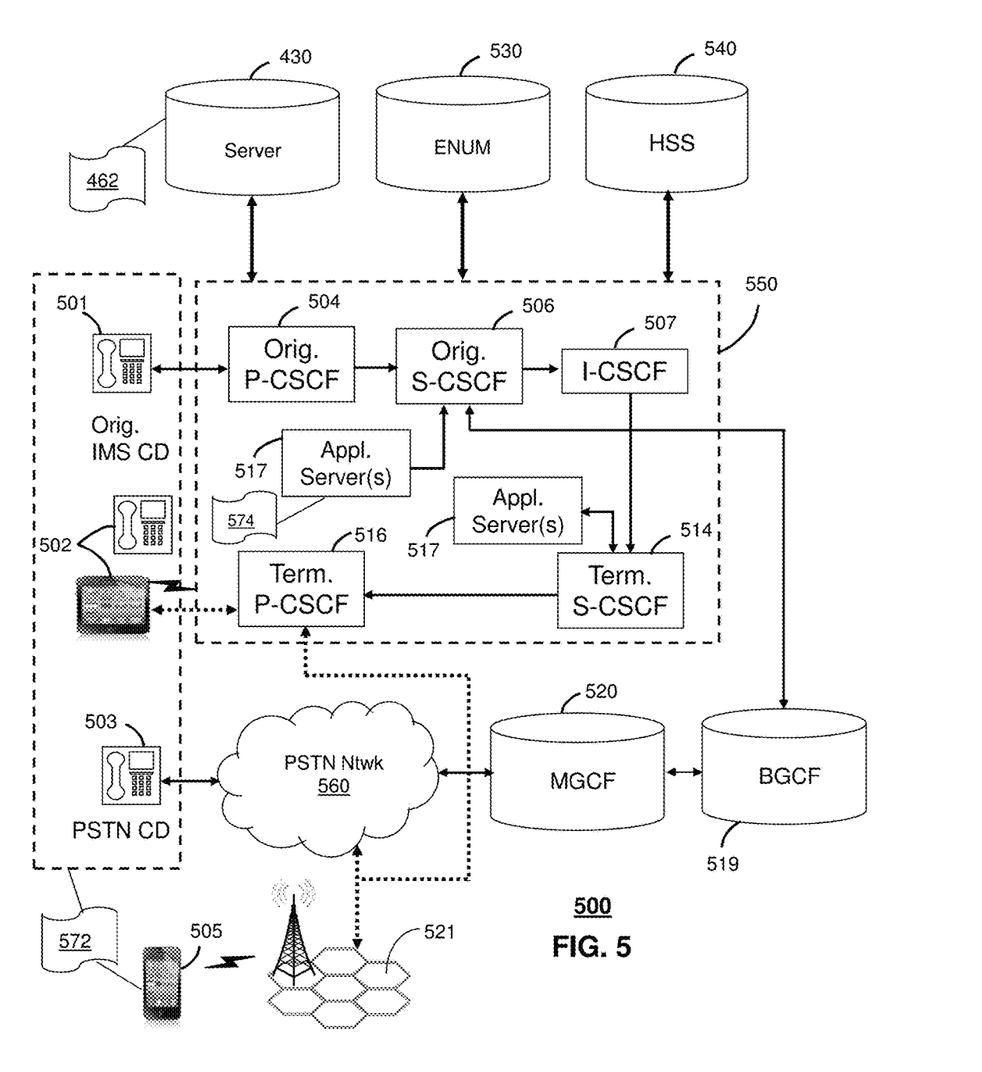

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100, 200 of FIGS. 1 and/or 2 and communication system 400 as another representative embodiment of communication system 400. Embodiments can include provisioning a first SIM into an available state. Further embodiments can include notifying a plurality of mobile network devices of an IMSI for the first SIM. Additional embodiments can include determining an expiry period for the available state. Also, embodiments can include purging the IMSI from the plurality of mobile network devices and entering a reclaimable state in response to an expiration of the expiry period.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The SIM manager 430 of FIG. 4 can be operably coupled to communication system 500 for purposes similar to those described above. SIM manager 430 can perform function 462 and thereby provide IMSI reclamation services to the CDs 501, 502, 503 and 505 of FIG. 5 similar to the functions described for server 108 and/or network registration device 110 of FIG. 1 in accordance with method 300 of FIG. 3. CDs 501, 502, 503 and 505, which can be adapted with software to perform function 572 to utilize the services of the SIM manager 430 similar to the functions described for communication devices 102, 112 of FIG. 1 in accordance with method 300 of FIG. 1. SIM manager 430 can be an integral part of the application server(s) 517 performing function 572, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
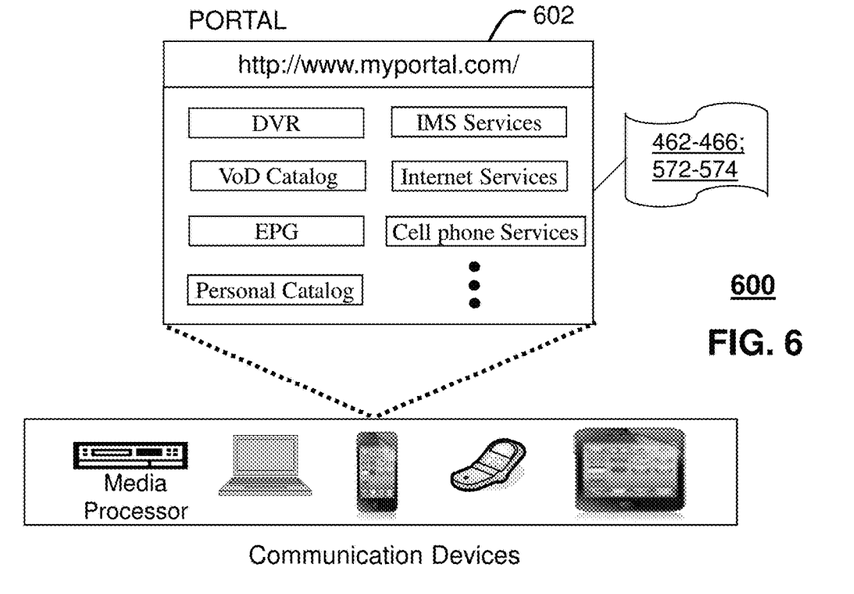
FIG. 6 depicts an illustrative embodiment of a web portal for interacting with the communication systems of provisioning IMSI reclamation services as shown in FIGS. 1-5.

FIG. 6 depicts an illustrative embodiment of a web portal 602 of a communication system 600. Communication system 600 can be overlaid or operably coupled with systems 100, 200 of FIGS. 1 and/or 2, communication system 400, and/or communication system 500 as another representative embodiment of systems 100, 200 XXX of FIGS. 1 and/or 2, communication system 400, and/or communication system 500. The web portal 602 can be used for managing services of systems 100, 200 of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 of FIGS. 1 and/or 2, and communication systems 400-500. For instance, users of the services provided by server 108, network registration device 110, or SIM manager 430, such as mobile network personnel, can log into their on-line accounts and provision the server 108, network registration device 110, or SIM manager 430 with an expiry timer or configure such an expiry timer according to factors of the mobile device associated with an IMSI, for example, and to enable it to communicate with devices described in FIGS. 1-5. Service providers can log onto an administrator account to provision, monitor and/or maintain the systems 100, 200 of FIGS. 1 and/or 2 or SIM manager 430.

Figure 7:
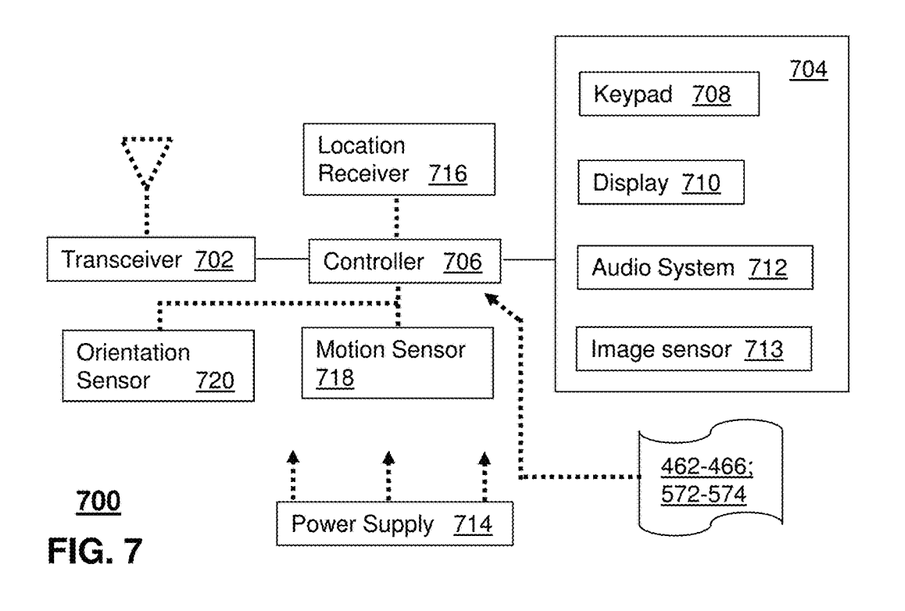
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
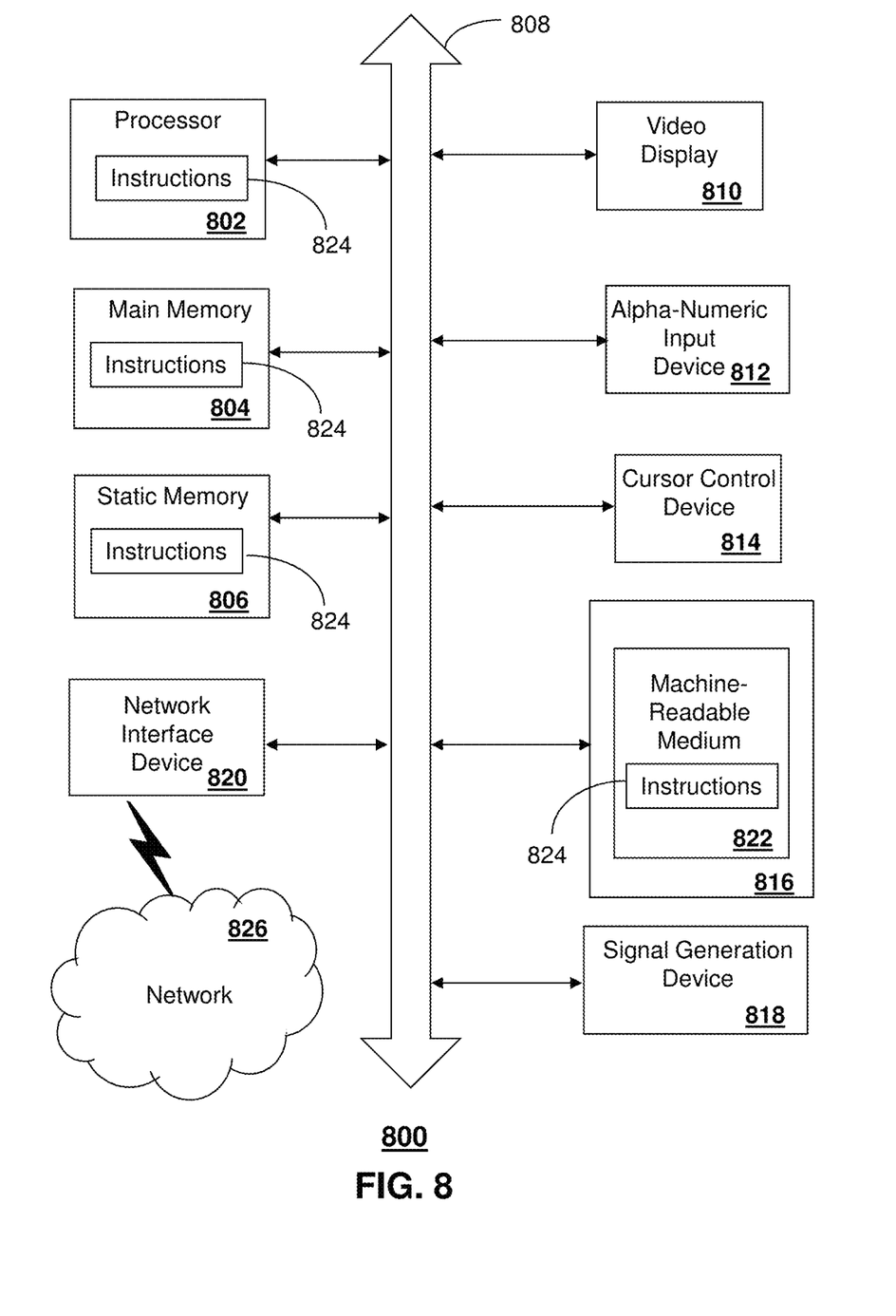
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the SIM manager 430, the media processor 406, communication devices 102, 112, SIM manager server 108, network registration device 110 and other devices of FIGS. 1-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, the operations comprising:
   designating an international mobile subscriber identity (IMSI) as in an available state, wherein the IMSI is associated with a first mobile device, wherein the available state is associated with an expiry period;
   responsive to detecting an expiration of the expiry period and determining that the first mobile device has not registered with any of a plurality of mobile network devices during the expiry period, purging the IMSI from the plurality of mobile network devices; and
   designating the IMSI as in a reclaimable state.

2. The device of claim 1, wherein the operations comprise detecting the IMSI is associated with a first subscriber identity module (SIM), wherein the first SIM is utilized by the first mobile device for registering with any of the plurality of mobile network devices.

3. The device of claim 2, wherein the operations further comprise identifying a plurality of factors for the first SIM.

4. The device of claim 3, wherein the determining the expiry period comprises determining the expiry period according the plurality of factors.

5. The device of claim 3, wherein the plurality of factors includes one of a card type, mobile device type, and stock keeping unit (SKU).

6. The device of claim 2, wherein the operations comprise:
   provisioning the IMSI to the first SIM; and
   notifying the plurality of mobile network devices of the IMSI for the first SIM.

7. The device of claim 1, wherein the operations comprise provisioning the IMSI with a second SIM onto a second mobile device.

8. The device of claim 7, wherein the first mobile device attempts to register with the plurality of mobile network devices after the IMSI is provisioned with the second SIM onto the second mobile device.

9. The device of claim 8, wherein the first mobile device receives a network error from at least one of the plurality of mobile network devices in response to the attempt to register.

10. A machine-readable storage medium, comprising executable instructions that, when executed by a processing system including a processor, facilitate performance of operations, the operations comprising:
    designating an international mobile subscriber identity (IMSI) as in an available state, wherein the IMSI is associated with a first subscriber identity module (SIM) of a first mobile device, wherein the available state is associated with an expiry period;
    responsive to detecting an expiration of the expiry period and determining that the first mobile device has not registered with any of a plurality of mobile network devices during the expiry period, purging the IMSI from the plurality of mobile network devices;
    designating the IMSI as in a reclaimable state; and
    provisioning the IMSI with a second SIM onto a second mobile device.

11. The machine-readable storage medium of claim 10, wherein the first mobile device attempts to register with the plurality of mobile network devices after the IMSI is provisioned with the second SIM onto the second mobile device.

12. The machine-readable storage medium of claim 11, wherein the first mobile device receives a network error from at least one of the plurality of mobile network devices in response to the attempt to register.

13. The machine-readable storage medium of claim 10, wherein the operations further comprise identifying a plurality of factors for the first SIM.

14. The machine-readable storage medium of claim 13, wherein the determining the expiry period comprises determining the expiry period according the plurality of factors.

15. The machine-readable storage medium of claim 13, wherein the plurality of factors includes one of a card type, mobile device type, and stock keeping unit (SKU).

16. The machine-readable storage medium of claim 10, wherein the operations comprise:
    provisioning the IMSI to the first SIM; and
    notifying the plurality of mobile network devices of the IMSI for the first SIM.

17. A method, comprising:
    designating, by a processing system including a processor, an international mobile subscriber identity (IMSI)

for a first mobile device as in an available state, wherein the available state is associated with an expiry period;

notifying, by the processing system, a plurality of mobile network devices of the IMSI associated with a first subscriber identity module (SIM); and responsive to detecting, purging, by the processing system, an expiration of the expiry period and determining that the first mobile device has not registered with any of the plurality of mobile network devices during the expiry period, purging, by the processing system, the IMSI from the plurality of mobile network devices and designating the IMSI as in a reclaimable state.

18. The method of claim 17, provisioning, by the processing system, the IMSI to the first SIM, wherein the first SIM is utilized by the first mobile device for registering with any of the plurality of mobile network devices.

19. The method of claim 17, comprising identifying, by the processing system, a plurality of factors for the first SIM.

20. The method of claim 19, wherein the determining the expiry period comprises determining, by the processing system, the expiry period according the plurality of factors.

* * * * *

UNITED STATES PATENT AND TRADEMARK OFFICE
CERTIFICATE OF CORRECTION

PATENT NO.        : 10,511,963 B2
APPLICATION NO.   : 16/239152
DATED             : December 17, 2019
INVENTOR(S)       : Inderpreet Singh Ahluwalia et al.

Page 1 of 1

It is certified that error appears in the above-identified patent and that said Letters Patent is hereby corrected as shown below:

On the Title Page

Item [63], delete "Oct. 4, 2017" and insert --Dec. 4, 2017--.

Signed and Sealed this
Fifth Day of May, 2020

Andrei Iancu
*Director of the United States Patent and Trademark Office*